(12) United States Patent
Nagata et al.

(10) Patent No.: US 6,626,388 B2
(45) Date of Patent: Sep. 30, 2003

(54) WEBBING RETRACTOR

(75) Inventors: Tomonori Nagata, Niwa-gun (JP); Shinji Mori, Niwa-gun (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/899,823

(22) Filed: Jul. 9, 2001

(65) Prior Publication Data
US 2002/0005447 A1 Jan. 17, 2002

(30) Foreign Application Priority Data
Jul. 11, 2000 (JP) ........................................ 2000-210531

(51) Int. Cl.7 ............................................... B60R 22/46
(52) U.S. Cl. ..................................... 242/374; 242/379.1
(58) Field of Search ............................. 242/374, 379.1; 280/806; 297/478

(56) References Cited

U.S. PATENT DOCUMENTS

| 5,553,890 | A | * | 9/1996 | Buhr et al. | 242/374 |
|---|---|---|---|---|---|
| 5,699,976 | A | * | 12/1997 | Hori | 242/374 |
| 5,788,176 | A | * | 8/1998 | Ebner et al. | 242/374 |
| 6,089,492 | A | * | 7/2000 | Nagata et al. | 242/374 |
| 6,152,391 | A | * | 11/2000 | Nagata et al. | 242/374 |
| 6,244,531 | B1 | * | 6/2001 | Hori et al. | 242/374 |
| 6,318,662 | B1 | * | 11/2001 | Hori et al. | 242/374 |
| 6,343,522 | B1 | * | 2/2002 | Hori et al. | 242/374 |
| 6,343,758 | B1 | * | 2/2002 | Abe et al. | 242/374 |
| 6,354,528 | B1 | * | 3/2002 | Nagata et al. | 242/374 |
| 6,443,380 | B1 | * | 9/2002 | Biller et al. | 242/374 |

* cited by examiner

Primary Examiner—Kathy Matecki
Assistant Examiner—Sang Kim
(74) Attorney, Agent, or Firm—Nixon Peabody LLP; Thomas W. Cole (57) ABSTRACT

In a webbing retractor having a pretensioner mechanism and a force limiter mechanism, when a drive member is rotated in one direction by the pretensioner mechanism, a cam plate is disposed at a sleeve side by an inner peripheral surface of a clutch ring. Thus, a roller engages with a sleeve, the sleeve is rotated integrally with the drive member, and a webbing is taken-up. When the sleeve is rotated in another direction by the force limiter mechanism, the cam plate is inserted into a recess portion of the clutch ring, and the cam plate is disposed at a side opposite to a sleeve side. Thus, rotation of the sleeve with respect to the drive member is permitted, and impeding of the pulling-out of the webbing can be prevented. Accordingly, a force limiter load can be determined by only a load required for deforming an energy absorbing member.

16 Claims, 7 Drawing Sheets

WEBBING RETRACTOR

BACKGROUND OF THE INVENTION

1. Field of the Invention

The present invention relates to a webbing retractor equipped with a pretensioner mechanism which eliminates slackness in a webbing at the time of an emergency of a vehicle due to a collision or the like, and a force limiter mechanism which limits the load applied to a vehicle occupant by the webbing to a predetermined amount or less.

2. Description of the Related Art

A webbing retractor is equipped with a pretensioner mechanism which eliminates slackness in a webbing at the time of an emergency of a vehicle due to a collision or the like.

Among such pretensioner mechanisms, there are pretensioner mechanisms using a so-called rack-and-pinion system. In a webbing retractor equipped with a rack-and-pinion-type pretensioner mechanism, a pinion is connected to a take-up shaft which takes-up a webbing, and the pinion always rotates integrally with the take-up shaft. Further, a substantially tube-shaped cylinder is provided in a vicinity of the pinion.

Within the cylinder, a fit-together portion, which is fit tightly with the inner wall of the cylinder, is provided at the lower portion, and a piston, at which a rack is provided, is slidably provided at the upper portion. At the time of an emergency of the vehicle, gas is supplied into the cylinder from beneath the fit-together portion of the piston. In this way, the piston receives the pressure of the gas from beneath, and rises within the cylinder. Due to the piston rising, the rack meshes with the pinion, and the pinion is rotated in the webbing take-up direction. In this way, at the time of an emergency of the vehicle, the webbing is taken-up on the take-up shaft, and the slackness in the webbing is cancelled.

Further, among webbing retractors provided with a pretensioner mechanism as described above, there are webbing retractors equipped with a force limiter mechanism which, at the time of an emergency of the vehicle, and in particular, at the time when a collision force is extremely large, lets out a predetermined amount of the webbing in order to limit the load applied to the vehicle occupant by the webbing to a given amount or less.

Such a force limiter mechanism is provided, for example, with an energy absorbing member. Due to a vehicle occupant receiving a large collision force at the time of an emergency of the vehicle, load is applied to the webbing holding the vehicle occupant. The energy absorbing member is deformed by the load applied to the webbing by the vehicle occupant, and the take-up shaft is thereby rotated in the webbing pull-out direction. In this way, at the time of an emergency of the vehicle, the webbing is pulled-out form the take-up shaft, and the load applied to the vehicle occupant by the webbing is limited to a given value or less.

However, in such a webbing retractor, when the force limiter mechanism is operated, the take-up shaft is rotated in the webbing pull-out direction. Thus, the pinion, which always rotates integrally with the take-up shaft, is also rotated in the webbing pull-out direction. In this way, the rack, which is meshing with the pinion, moves, and the piston falls within the cylinder. Thus, the pressure of the gas within the cylinder (beneath the fit-together portion) rises, and lowering of the piston is impeded. Therefore, a load is applied to the take-up shaft which is rotating in the webbing pull-out direction, and pulling-out of the webbing is impeded.

Figure 7:
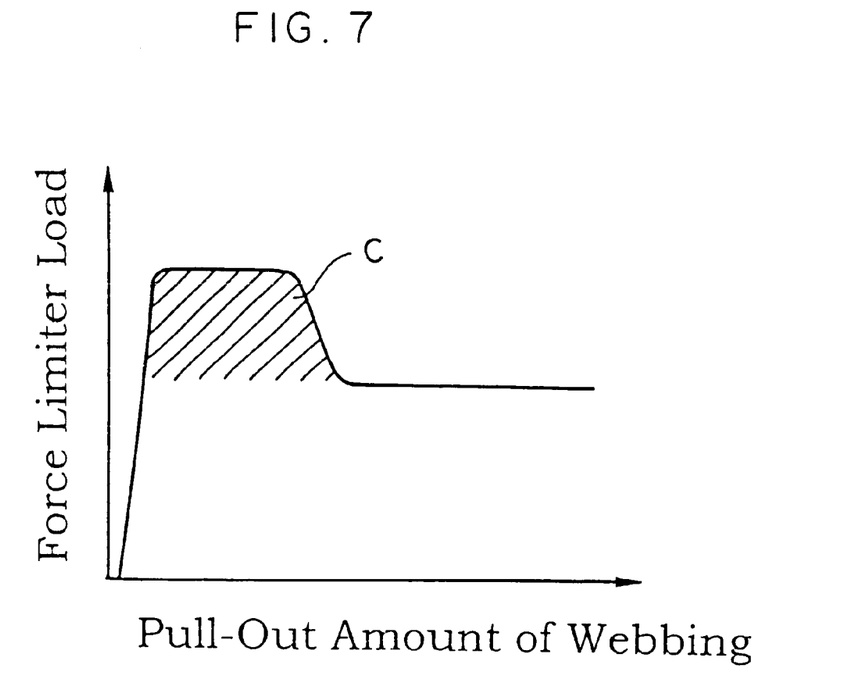
FIG. 7 is a graph showing the relationship between a force limiter load (on the ordinate) and a pull-out amount of a webbing (on the abscissa), in a conventional webbing retractor.

Accordingly, as shown in FIG. 7, the so-called force limiter load (which is equivalent to the load for the webbing to be pulled out at the time of an emergency of the vehicle) is a load in which the load (the load of the portion marked C in FIG. 7) due to the pressure of the gas in the cylinder (the raised pressure due to the falling of the piston) is added to the load for the energy absorbing member to deform. In this way, a problem arises in that it is difficult to set the force limiter load, and the range of setting is narrow.

SUMMARY OF THE INVENTION

In view of the above circumstances, an object of the present invention is to provide a webbing retractor in which setting of a force limiter load is easy, and a range of setting the force limiter load can be broadened.

A webbing retractor relating to a first aspect of the present invention includes: a take-up shaft which, by being rotated in one direction, takes-up a webbing, and by being rotated in another direction, pulls-out a webbing; a pretensioner mechanism which takes-up the webbing by rotating the take-up shaft in the one direction at a time of an emergency of a vehicle; and a force limiter mechanism having an energy absorbing member which is deformable, and at a time of an emergency of the vehicle, the force limiter mechanism pulls-out the webbing by rotating the take-up shaft in the other direction by deforming the energy absorbing member by load applied to the webbing by a vehicle occupant, wherein the webbing retractor comprises: (a) a sleeve provided at the take-up shaft, and always rotating integrally with the take-up shaft; (b) a drive member having a substantially hollow cylindrical peripheral wall, and provided in a state in which the sleeve is surrounded by the peripheral wall, the drive member being rotated in the one direction by the pretensioner mechanism; (c) a hollow portion formed in the peripheral wall of the drive member, and communicating an interior portion and an exterior portion of the peripheral wall; (d) a cam plate provided in the hollow portion and able to be freely disposed at a sleeve side or at a side opposite a sleeve side; (e) a roller provided within the hollow portion between the cam plate and the sleeve, and at a time when the drive member is rotated in the one direction, when the cam plate is disposed at the sleeve side, the roller is pressed by the cam plate and engages with the sleeve; and (f) a clutch device provided at an outer periphery of the peripheral wall of the drive member in correspondence with the cam plate, and at a time when the drive member is rotated in the one direction by the pretensioner mechanism, the clutch device disposes the cam plate at the sleeve side and makes the roller engage with the sleeve so as to rotate the sleeve integrally with the drive member, and at a time when the sleeve is rotated in the other direction by the force limiter mechanism via the take-up shaft, the clutch device disposes the cam plate at the side opposite the sleeve side so as to permit relative rotation of the sleeve with respect to the drive member.

In the webbing retractor of the present invention, preferably, the clutch device includes: (a) an anchor valley formed in a configuration which is recessed toward an inner side of the drive member along a peripheral direction of an outer surface of the peripheral wall of the drive member, the anchor valley having an end portion at each of a rotating direction one direction side and a rotating direction other direction side; (b) a clutch ring formed in a substantially hollow cylindrical shape, and provided in a state of surrounding the peripheral wall of the drive member; (c) an anchor mountain formed in a configuration which protrudes toward the sleeve at an inner peripheral surface of the clutch ring in correspondence with the anchor valley, the anchor mountain being inserted into the anchor valley; (d) a recess portion formed in a configuration which is recessed toward the side opposite the sleeve side in the inner peripheral surface of the clutch ring in correspondence with the cam plate, and when the end portion of the anchor valley at the rotating direction one direction side engages with the anchor mountain, the cam plate is insertable into the recess portion; (e) a limiting device provided at the clutch ring and limiting rotation of the clutch ring in the other direction, wherein at a time when the drive member is rotated in the one direction by the pretensioner mechanism, in a state in which the drive member and the clutch ring are rotated integrally due to the end portion of the anchor valley at the rotating direction other direction side engaging the anchor mountain, the cam plate is anchored on the inner peripheral surface of the clutch ring and the cam plate is disposed at the sleeve side, and at a time when the sleeve is rotated in the other direction by the force limiter mechanism, in a state in which rotation of the clutch ring in the other direction is limited by the limiting device, the drive member is rotated by a predetermined angle in the other direction via the roller and the end portion of the anchor valley at the rotating direction one direction side engages with the anchor mountain, such that the cam plate is inserted into the recess portion and is disposed at the side opposite the sleeve side.

Further, preferably, the cam plate has, at a sleeve side side wall of the cam plate, an inclined surface which approaches the sleeve along a direction toward the rotating direction other direction side; and at a time when the drive member is rotated in the one direction by the pretensioner mechanism, in a state in which the cam plate is disposed at the sleeve side by the clutch device, the inclined surface rotates toward the one direction with respect to the roller, and the roller is pressed by the inclined surface such that the roller engages with the sleeve.

A pretensioner mechanism is provided in the webbing retractor of the present invention. When the drive member is rotated in the one direction by the pretensioner mechanism at the time of an emergency of the vehicle, the cam plate within the hollow portion of the drive member peripheral wall is disposed at the sleeve side by the clutch device. In this way, the roller between the cam plate and the sleeve is pressed by the cam plate and engages with the sleeve. As a result, the sleeve is rotated integrally with the drive member, and the take-up shaft is rotated in the one direction. Accordingly, at the time of an emergency of the vehicle, the webbing is taken-up on the take-up shaft, and slackness in the webbing is eliminated.

Further, a force limiter device is provided in the webbing retractor of the present invention. At the time of an emergency of the vehicle, due to the force limiter device, the energy absorbing member is deformed by the load applied to the webbing by the vehicle occupant, and the take-up shaft is thereby rotated in the other direction. In this way, at the time of an emergency of the vehicle, the webbing is pulled-out from the take-up shaft, and the load applied to the vehicle occupant by the webbing is limited to a given amount or less.

Here, when the take-up shaft is rotated in the other direction by the force limiter mechanism, the sleeve is rotated in the other direction. At this time, the cam plate is disposed at the side opposite to the sleeve side by the clutch device. The pressing of the roller by the cam plate is thereby cancelled, and relative rotation of the sleeve with respect to the drive member is permitted. Accordingly, when the take-up shaft is rotated in the other direction by the force limiter mechanism, the rotation of the take-up shaft is not transmitted to the drive member. In this way, even in a case in which load is applied to rotation of the drive member in the other direction, impeding of rotation of the take-up shaft in the other direction and impeding of the pulling-out of the webbing can be prevented.

Thus, it is possible for the force limiter load (the load for the webbing to be pulled out at the time of an emergency of the vehicle) to be determined only by the load for deforming the energy absorbing member. In this way, setting of the force limiter load is easy, and the range of setting of the force limiter load can be broadened.

Further, in the webbing retractor of the present invention, at the time when the drive member is rotated in the one direction by the pretensioner mechanism, the other direction side end portion of the anchor valley of the drive member engages with the anchor mountain of the clutch ring. In this way, in a state in which the drive member and the clutch ring are rotated integrally, the cam plate is anchored on the inner peripheral surface of the clutch ring, and the cam plate is disposed at the sleeve side. Accordingly, the sleeve is easily and reliably rotated integrally with the drive member, and the take-up shaft can be rotated in the one direction.

On the other hand, at the time when the sleeve is rotated in the other direction by the force limiter mechanism, in the state in which rotation of the clutch ring in the other direction is limited by the limiting device, the drive member is rotated by a predetermined angle in the other direction via the roller, and the one direction side end portion of the anchor valley of the drive member engages with the anchor mountain of the clutch ring. In this way, the cam plate is inserted into the recess portion of the clutch ring, and the cam plate is disposed at the side opposite the sleeve side. Accordingly, the pressing of the roller by the cam plate can be easily and reliably cancelled, and the sleeve can be rotated relative to the drive member.

In the webbing retractor of the present invention, an inclined surface, which approaches the sleeve along the direction toward the other direction side, is formed at the sleeve side side wall of the cam plate.

Here, when the drive member is rotated in the one direction by the pretensioner mechanism, in the state in which the cam plate is disposed at the sleeve side by the clutch device, the inclined surface of the cam plate rotates toward the one direction with respect to the roller, and the roller is pressed by the inclined surface. The roller thereby engages with the sleeve. In this way, the sleeve is even more easily and reliably rotated integrally with the drive member, and the take-up shaft can be rotated in the one direction.

DESCRIPTION OF THE PREFERRED EMBODIMENTS

Figure 4:
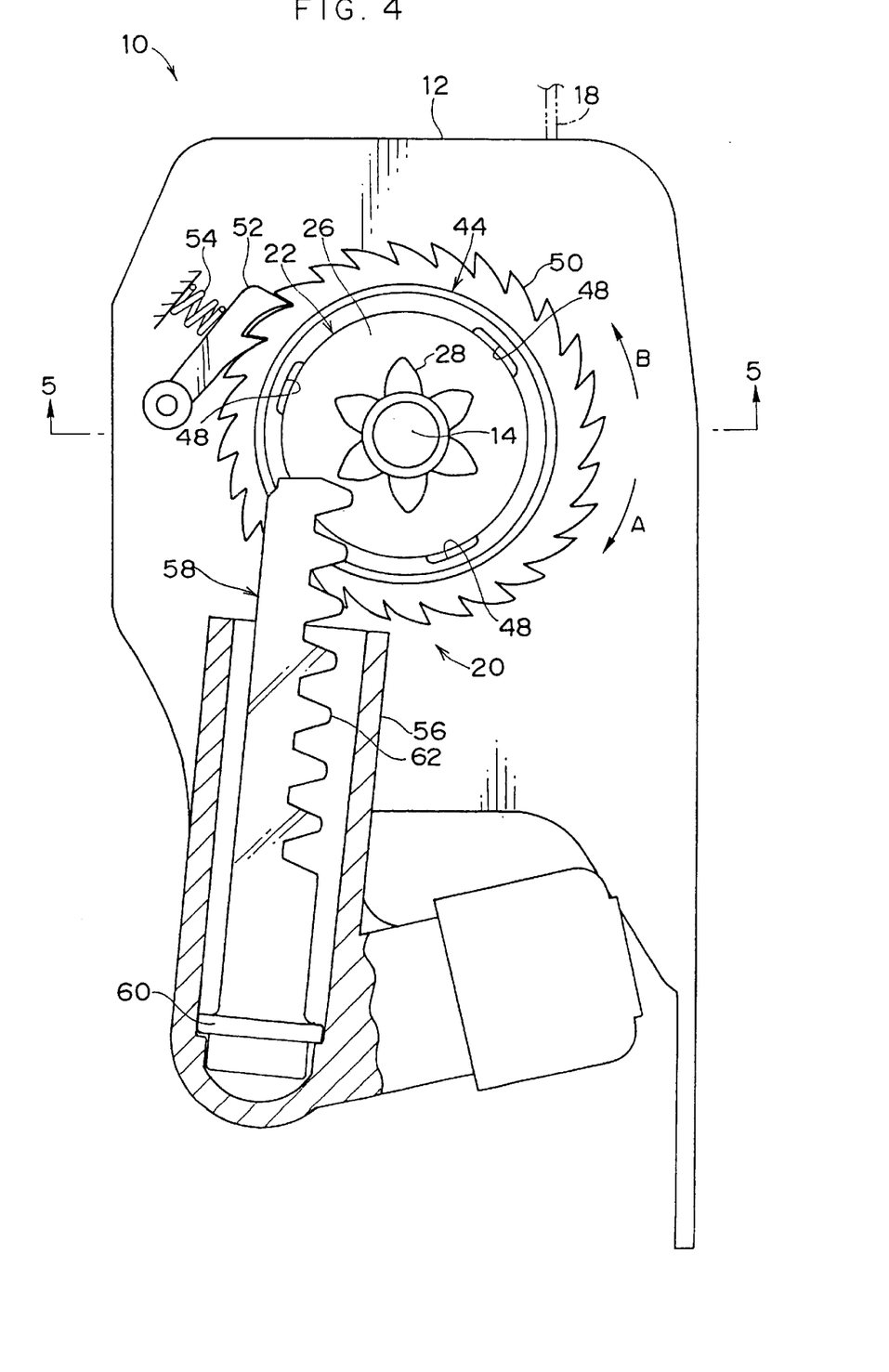
FIG. 4 is a side view showing a schematic structure of the webbing retractor relating to the embodiment of the present invention.
Figure 5:
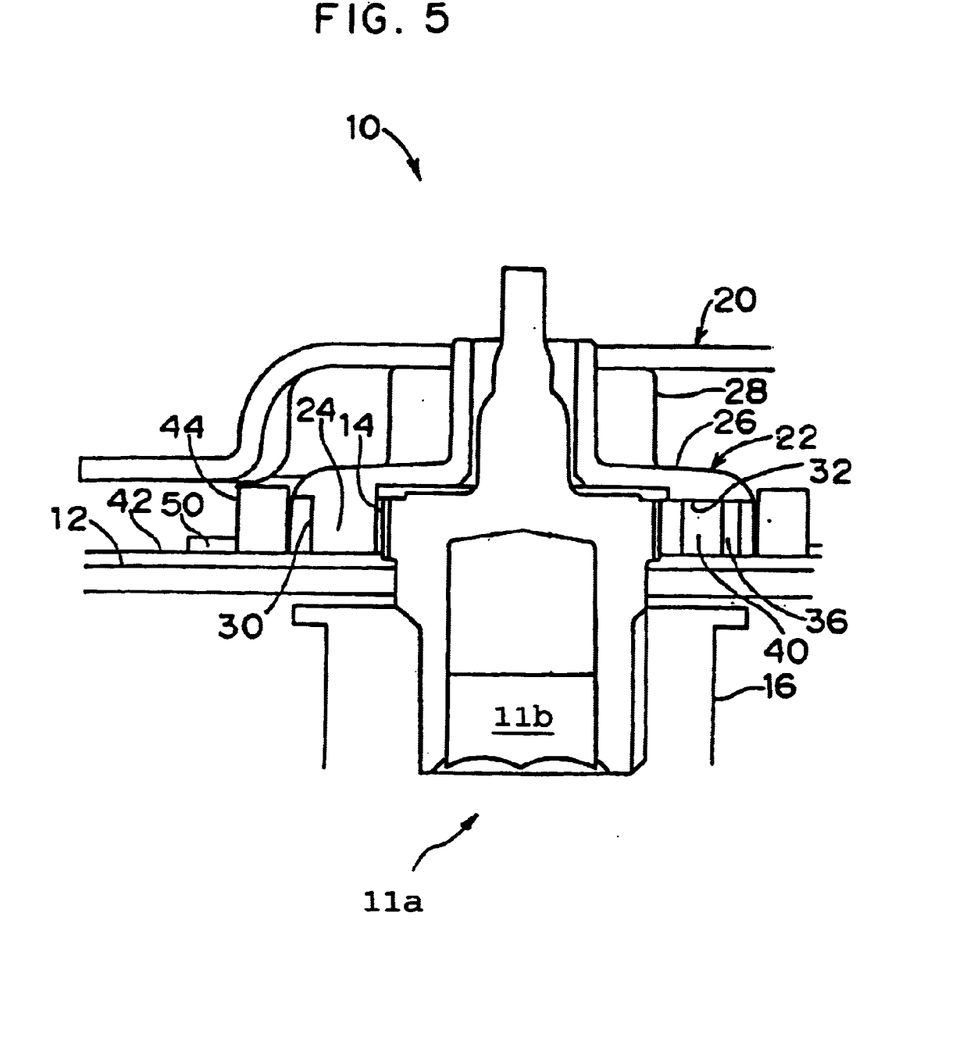
FIG. 5 is a cross-sectional view (along line 5—5 of FIGS. 1 and 4) showing main portions of the webbing retractor relating to the embodiment of the present invention.

In FIG. 4, a schematic structure of a webbing retractor 10 relating to an embodiment of the present invention is illustrated in side view. In FIG. 5, main portions of the webbing retractor 10 are illustrated in cross-section (a cross-section along line 5—5 of FIG. 4).

The webbing retractor 10 has a frame 12. The frame 12 is fixed to a vehicle, and a sleeve 14 is supported so as to be freely rotatable at the frame 12. A spool 16 serving as a take-up shaft is fixed integrally to the outer periphery of the sleeve 14 within the frame 12. The sleeve 14 and the spool 16 always rotate integrally. A webbing 18 is taken-up onto the spool 16. The webbing 18 is taken-up or pulled-out due to rotation of the spool 16. Here, the rotating direction for taking-up the webbing 18 is direction A, and the pull-out direction is direction B.

The webbing retractor 10 is provided with a rack-and-pinion-type pretensioner mechanism 20. The internal structure of the main portions of the pretensioner mechanism 20 are shown in side view in FIG. 1.

Figure 1:
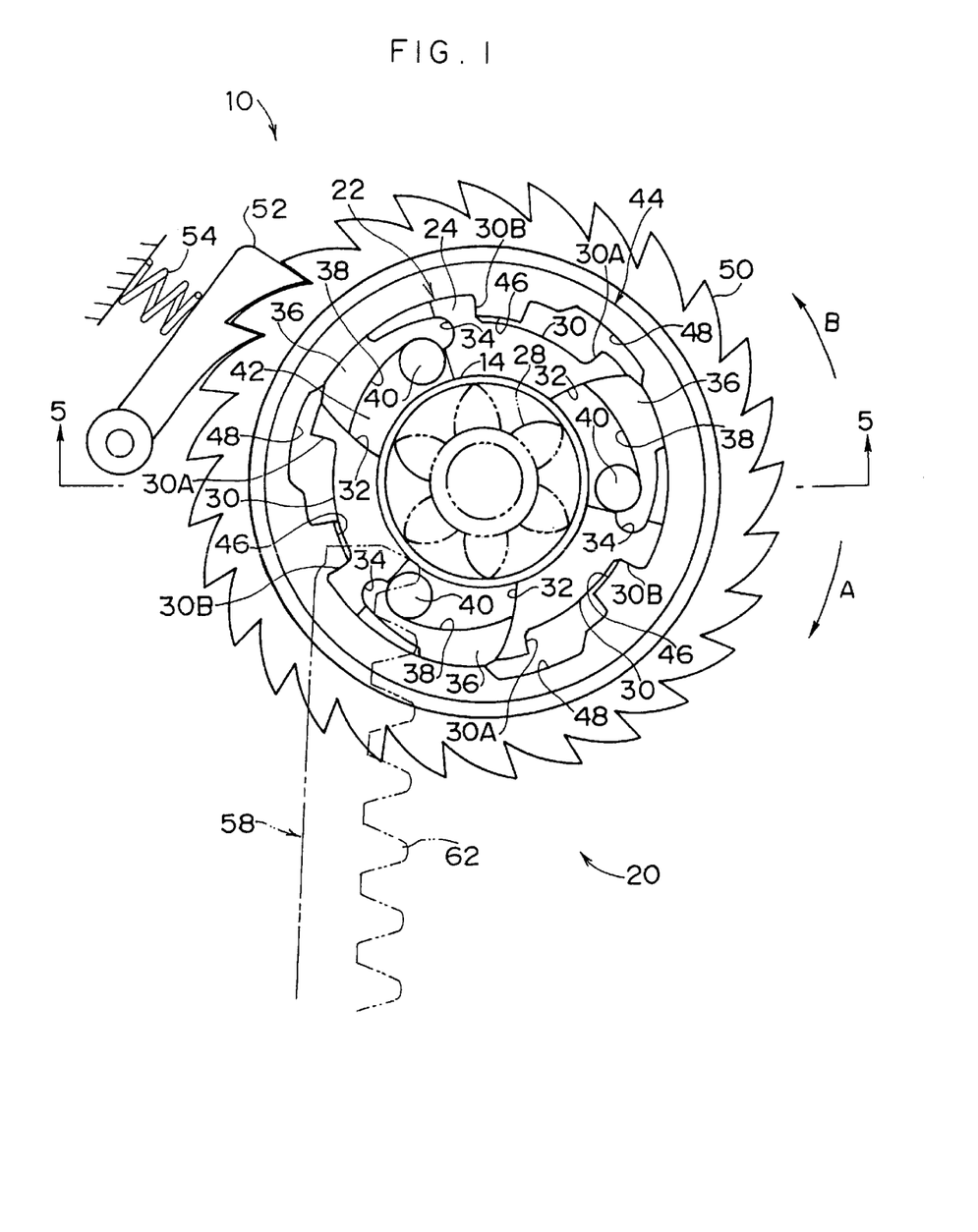
FIG. 1 is a side view illustrating an internal structure, at a normal time, of main portions of a pretensioner mechanism of a webbing retractor relating to an embodiment of the present invention.

As shown in FIG. 1, the pretensioner mechanism 20 has a drive member 22. The drive member 22 has a substantially hollow cylindrical peripheral wall 24, and a substantially toric side wall 26 which is provided integrally with the peripheral wall 24. A pinion 28 is provided integrally with the central portion of the side wall 26. The central portion of the pinion 28 is hollow. The pinion 28 is supported, at the central portion thereof, at an end portion of the sleeve 14 so as to be freely rotatable. Accordingly, the drive member 22 is rotatably supported in a vicinity of an end portion of the sleeve 14 in a state in which the sleeve 14 is surrounded by the peripheral wall 24.

A predetermined number (three in the present embodiment) of anchor valleys 30 is provided along the peripheral direction in the outer surface of the peripheral wall 24 of the drive member 22. Each anchor valley 30 is recessed toward the inner side of the drive member 22.

A predetermined number (three in the present embodiment) of hollow portions 32 are formed in the peripheral wall 24 of the drive member 22. The inner portion and the outer portion of the peripheral wall 24 are communicated by the hollow portions 32. A substantially semicircular support hole 34 is formed in each hollow portion 32 at the rotating direction A direction side (hereinafter, "A side") surface thereof. The rotating direction B direction side (hereinafter, "B side") surface of each hollow portion 32 is formed in a substantially circular arc shape.

A cam plate 36 is fit into each hollow portion 32. The A side side end portion of the cam plate 36 is fit together with the support hole 34, and the B side surface of the cam plate 36 is formed in a substantially circular arc shape and is fit with the B side surface of the hollow portion 32. In this way, the cam plates 36 are supported so as to rotate freely within the hollow portions 32 around the A side end portions. An inclined surface 38 is formed at the sleeve 14 side side wall of the cam plate 36. The inclined surface 38 approaches the sleeve 14 side along the direction toward the B side of the cam plate 36. Further, due to the B side region of the cam plate 36 being anchored on the inner peripheral surface of a clutch ring 44 which will be described later, the cam plate 36 is disposed at the sleeve 14 side, whereas due to the B side region of the cam plate 36 being inserted into a recess portion 48 of the clutch ring 44, the cam plate 14 is disposed at the side opposite the sleeve 14 side.

A substantially solid cylindrical roller 40 is provided between the cam plate 36 and the sleeve 14, within each hollow portion 32. Each roller 40 is held by adhesion or the like to a case gear 42 (see FIG. 5) which is fixed to the frame 12, and abuts the A side end portion of the cam plate 36. Each roller 40 is set apart from the sleeve 14.

The substantially hollow cylindrical clutch ring 44 is provided at the outer periphery of the drive member 22 so as to correspond to the cam plates 36. Due to the clutch ring 44 being fit together with the peripheral wall 24 of the drive member 22, the clutch ring 44 surrounds the peripheral wall 24. A predetermined number (three in the present embodiment) of anchor mountains 46 are formed at the inner peripheral surface of the clutch ring 44 in correspondence with the anchor valleys 30. Each anchor mountain 46 is formed to project toward the inner side of the clutch ring 44, and is inserted into the anchor valley 30. The predetermined number (three in the present embodiment) of recess portions 48 are formed in the inner peripheral surface of the clutch ring 44 in correspondence with the cam plates 36. Each recess portion 48 is formed in a shape which is recessed toward the outer side of the clutch ring 44. Here, when the A side end portions 30A of the anchor valley 30 engage with the anchor mountains 46, the B side regions of the respective cam plates 36 can be inserted into the recess portions 48.

A gear 50, which forms a limiting device, is provided integrally with the outer periphery of the clutch ring 44. A pawl 52, which forms the limiting device, is supported so as to be freely rotatable and so as to correspond to the gear 50, at the outer side of the gear 50. The pawl 52 meshes with the gear 50 due to urging force of pressing member forming the limiting device. In this way, rotation of the clutch ring 44 in direction A only is permitted, whereas rotation in direction B is limited (impeded) by the pawl 52. Note that, in the present embodiment, a compression coil spring 54 is used as the pressing member. However, the pressing member is not limited to the compression coil spring 54, and any structure can be used provided that a sufficient urging force for making the pawl 52 mesh with the gear 50 can be applied to the pawl 52.

Figure 2:
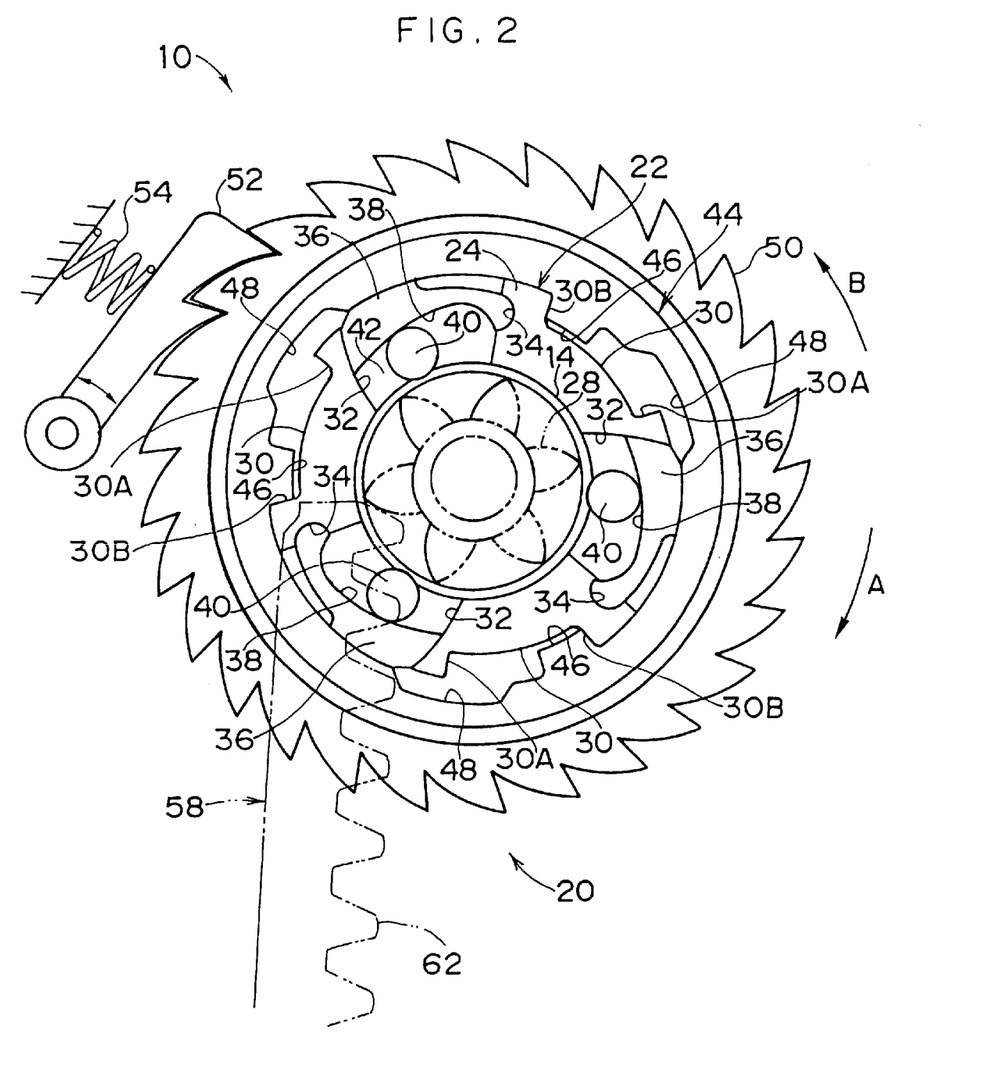
FIG. 2 is a side view illustrating an internal structure, at a time when the pretensioner mechanism is operated, of main portions of the pretensioner mechanism of the webbing retractor relating to the embodiment of the present invention.

As shown in FIG. 2, when the drive member 22 is rotated in direction A, due to B side end portions 30B of the anchor valleys 30 engaging with the anchor mountains 46, with the drive member 22 and the clutch ring 44 rotating integrally, the B side regions of the cam plates 36 anchor on the inner peripheral side of the clutch ring 44, and the cam plates 36 are disposed at the sleeve 14 side. In this way, the inclined surfaces 38 of the cam plates 36 rotate toward the A direction side with respect to the rollers 40. The inclined surfaces 38 are inclined such that, as they approach the B side end portions of the cam plates 36, they approach the sleeve 14 side. Thus, the rollers 40 are pressed by the inclined surfaces 38. As a result, the holding of the rollers 40 by the case gear 42 is cancelled, and the rollers 40 engage with the sleeve 14.

Figure 3:
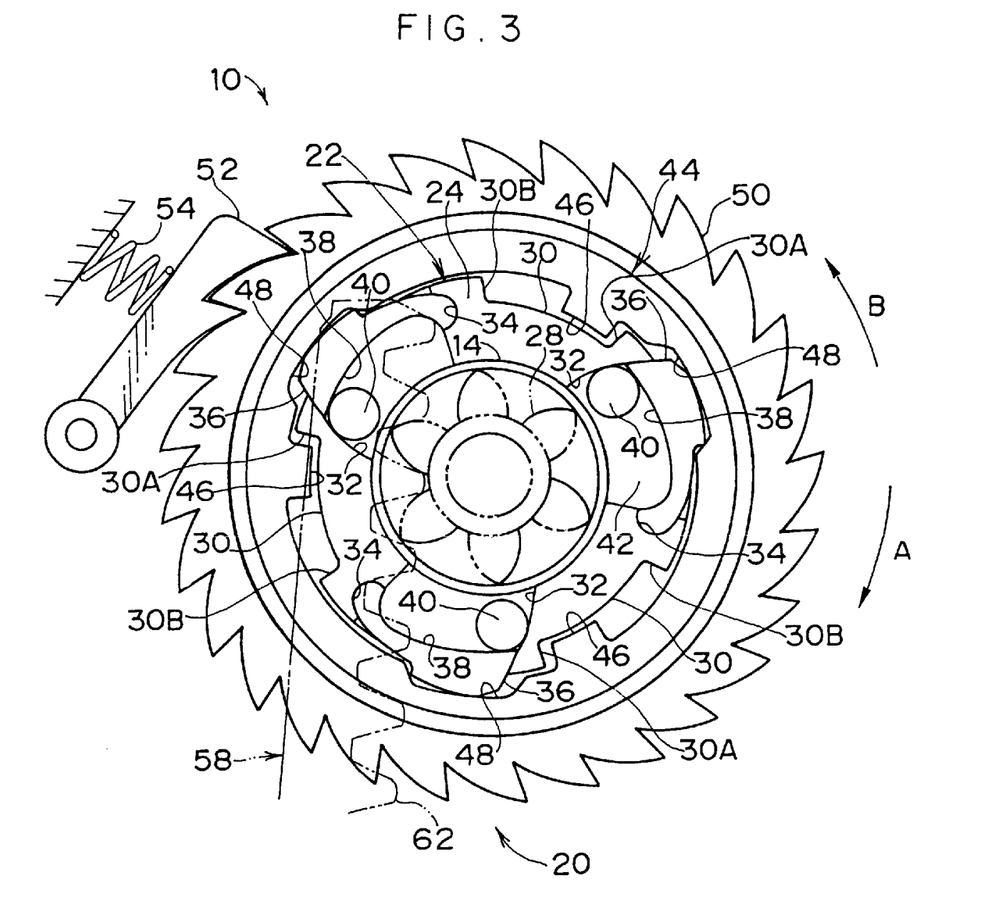
FIG. 3 is a side view illustrating an internal structure, at a time when a force limiter mechanism is operated, of main portions of the pretensioner mechanism of the webbing retractor relating to the embodiment of the present invention.

On the other hand, as shown in FIG. 3, after the rollers 40 engage with the sleeve 14, when the sleeve 14 is rotated in direction B, in the state in which the rotation of the clutch ring 44 in direction B is limited by the pawl 52, the drive member 22 is rotated by a predetermined angle in direction B via the rollers 40, and the A side end portions 30A of the anchor valleys 30 engage with the anchor mountains 46. Thus, the B side regions of the cam plates 36 are inserted into the recess portions 48, and the cam plates 36 are disposed at the side opposite the sleeve 14 side. The pushing of the rollers 40 by the cam plates 36 is thereby released, and relative rotation of the sleeve 14 with respect to the drive member 22 is permitted.

Further, as shown in FIG. 4, a cylinder 56 is fixed to the frame 12. The cylinder 56 is formed in a substantially hollow cylindrical shape, and the upper end side of the cylinder 56 is open in a vicinity of the drive member 22. A gas supply opening (not shown) is provided at the lower end side (the side opposite the pinion 28 side) of the cylinder 56. A gas generating device (not shown) is connected to the gas supply opening. At the time of an emergency of the vehicle due to a collision or the like, the gas generated by the gas generating device is supplied into the cylinder 56 from the gas supply opening.

A substantially solid cylindrical piston 58 is provided within the cylinder 56. A disc-shaped fit-together portion 60 is formed in a vicinity of the lower end (the end portion opposite the pinion 28 side) of the piston 58. The piston 58 is held slidably in a state in which the fit-together portion 60 is closely fit to the inner wall of the cylinder 56. Here, as described above, the gas supply opening is disposed at the side beneath the fit-together portion 60 (i.e., the side of the fit-together portion 60 opposite the pinion 28 side). Thus, when gas is supplied into the cylinder 56, the lower end of the piston 58 and the fit-together portion 60 and the like receive the pressure of the gas, and the piston 58 thereby rises toward the pinion 28 side.

A rack 62 is provided at the upper portion of the piston 58. The rack 62 corresponds to the pinion 28. When the piston 58 rises toward the pinion 28, the rack 62 meshes with the pinion 28. In this way, the drive member 22 is rotated in one direction via the pinion 28.

Further, the webbing retractor 10 is provided with a force limiter mechanism 11a. The force limiter mechanism has an energy absorbing member 11b. At the time of an emergency of the vehicle, due to the load applied to the webbing 18 by the vehicle occupant, the energy absorbing member deforms, the spool 16 is rotated in direction B, and the webbing 18 is pulled-out from the spool 16.

Next, operation of the present embodiment will be described.

The pretensioner mechanism 20 is provided in the webbing retractor 10 having the above-described structure. At the time of an emergency of the vehicle, gas from the gas generating device (not shown) is supplied from the gas supply opening (not shown) into the cylinder 56 (the side beneath the fit-together portion 60 of the piston 58). Due to the pressure of the supplied gas, the piston 58 rises toward the pinion 28, and the pinion 28 is rotated in direction A, and the drive member 22 is rotated in direction A. As shown in FIG. 2, when the drive member 22 is rotated in direction A, the B side end portions 30B of the anchor valleys 30 engage with the anchor mountains 46. In this way, with the drive member 22 and the clutch ring 44 rotating integrally, the B side regions of the cam plates 36 anchor on the inner peripheral surface of the clutch ring 44, and the cam plates 36 are disposed at the sleeve 14 side. In this way, the inclined surfaces 38 of the cam plates 36 rotate toward the A side with respect to the rollers 40, and the rollers 40 are pressed by the inclined surfaces 38. The holding of the rollers 40 by the case gear 42 is thereby released, and the rollers 40 engage with the sleeve 14. In this way, the sleeve 14 is rotated integrally with the drive member 22, and the spool 16 is rotated in direction A. Accordingly, at the time of an emergency of the vehicle, the webbing 18 is taken-up onto the spool 16, and slackness of the webbing 18 is eliminated.

The webbing retractor 10 is equipped with a force limiter mechanism 11a. At the time of an emergency of the vehicle, the energy absorbing member 11b is deformed due to the load applied to the webbing 18 by the vehicle occupant, and the spool 16 is rotated in direction B. In this way, the webbing 18 is pulled out from the spool 16, and the load applied to the vehicle occupant by the webbing 18 is limited to a given value or less.

Here, as shown in FIG. 3, when the sleeve 14 is rotated in direction B via the spool 16 by the force limiter mechanism, in a state in which rotation of the clutch ring 44 in direction B is limited by the pawl 52, the drive member 22 is rotated by a predetermined angle in direction B via the rollers 40, and the A side end portions 30A of the anchor valleys 30 engage with the anchor mountains 46. In this way, the B side regions of the cam plates 36 are inserted into the recess portions 48, and the cam plates 36 are disposed at the side opposite the sleeve 14 side. In this way, the pressing of the rollers 40 by the cam plates 36 is cancelled, and relative rotation of the sleeve 14 with respect to the drive member 22 is permitted. Accordingly, when the spool 16 is rotated in direction B by the force limiter mechanism, the rotation of the spool 16 is not transmitted to the drive member 22. As in the present embodiment, even in a case in which load is applied to rotation of the drive member 22 in direction B due to the falling of the piston 58 being impeded due to the gas within the cylinder 56, rotation of the spool 16 in direction B is not impeded, and hindering of pulling-out of the webbing 18 can be prevented.

As a result, the force limiter load (the load for the webbing 18 to be pulled-out at the time of an emergency of the vehicle) can be determined only by the load for deforming the energy absorbing member. In this way, setting of the force limiter load is easy, and the range of setting can be broadened.

Further, as described above, when the drive member 22 is rotated in direction A by the pretensioner mechanism 20, the cam plates 36 are disposed at the sleeve 14 side by the inner peripheral surface of the clutch ring 44, the anchor mountains 46, and the anchor valleys 30 of the drive member 22. Thus, the sleeve 14 is easily and reliably made to rotate integrally with the drive member 22, and the spool 16 can be rotated in direction A.

Further, as described above, when the drive member 22 rotates in direction A due to the pretensioner mechanism 20, the rollers 40 engage with the sleeve 14 due to the inclined surfaces 38 of the cam plates 36. Thus, the sleeve 14 can be even more easily and reliably made to rotate integrally with the drive member, and the spool 16 can be rotated in direction A.

Further, as described above, when the sleeve 14 is rotated in direction B by the force limiter mechanism, the cam plates 36 are disposed at the side opposite to the sleeve 14 side by the limiting device which is the anchor mountains 46 and recess portions 48 of the clutch ring 44, the anchor valleys 30 of the drive member 22, the pawl 52, and the like. Thus, the pressing of the rollers 40 by the cam plates 36 can be easily and reliably released, and the sleeve 14 can be rotated relative to the drive member 22.

Figure 6:
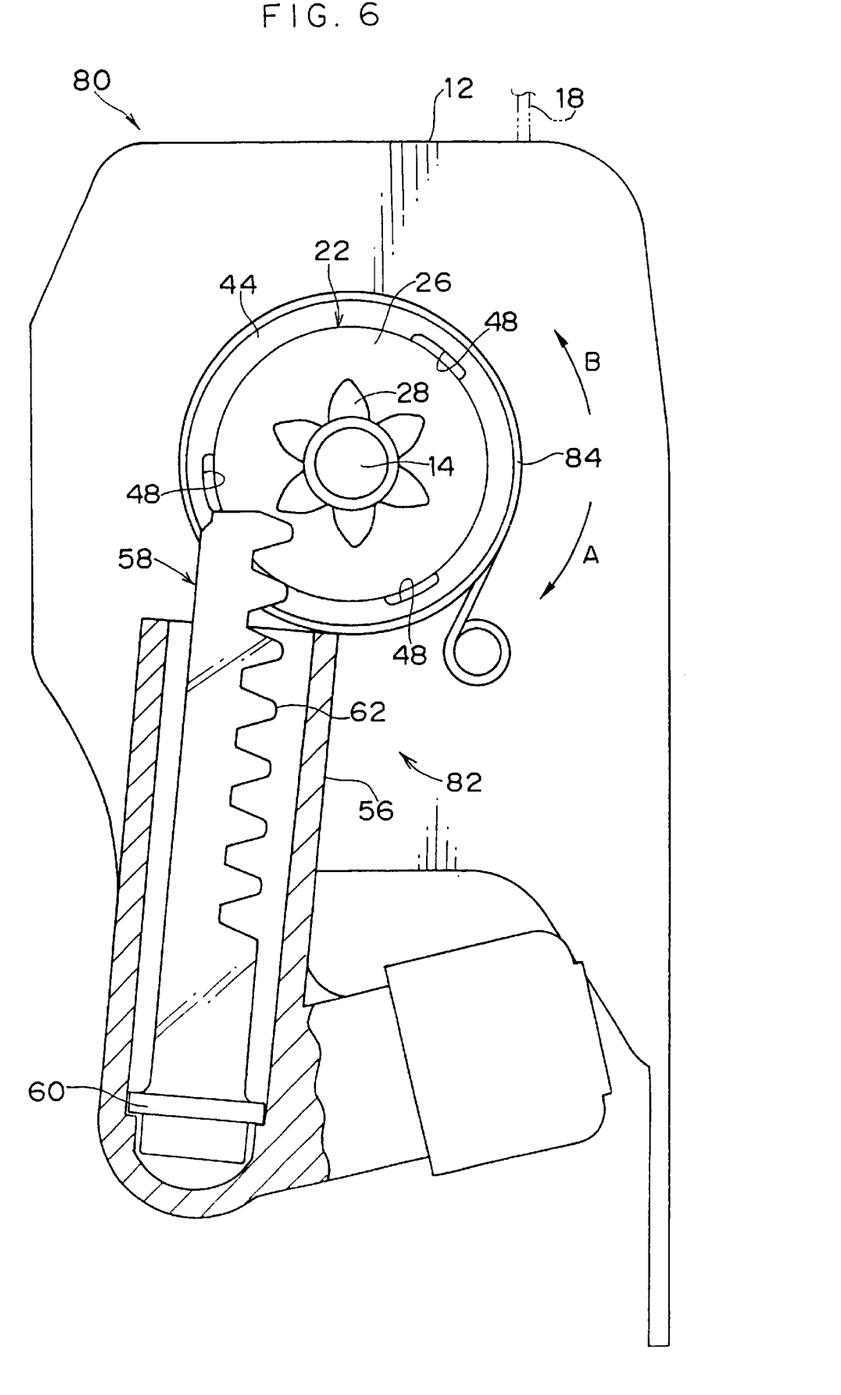
FIG. 6 is a side view showing another example of the webbing retractor relating to the embodiment of the present invention.

In the present embodiment, the gear 50, the pawl 52 and the compression coil spring 54 are used as the limiting device. However, as in a pretensioner mechanism 82 of a webbing retractor 80 shown in FIG. 6, a clutch spring 84, which allows rotation of the clutch ring 44 only in direction A and limits rotation in direction B, may be used as the limiting device.

What is claimed is:

1. A webbing retractor which includes:
    a take-up shaft which, by being rotated in one direction, takes-up a webbing, and by being rotated in another direction, pulls-out a webbing;
    a pretensioner mechanism which takes-up the webbing by rotating the take-up shaft in the one direction at a time of an emergency of a vehicle; and
    a force limiter mechanism having an energy absorbing member which is deformable, and at a time of an emergency of the vehicle, the force limiter mechanism pulls-out the webbing by rotating the take-up shaft in the other direction by deforming the energy absorbing member by load applied to the webbing by a vehicle occupant,
    wherein the webbing retractor comprises:
        (a) a sleeve provided at the take-up shaft, and always rotating integrally with the take-up shaft;
        (b) a drive member having a substantially hollow cylindrical peripheral wall, and provided in a state in which the sleeve is surrounded by the peripheral wall, the drive member being rotated in the one direction by the pretensioner mechanism;
        (c) a hollow portion formed in the peripheral wall of the drive member, and communicating an interior portion and an exterior portion of the peripheral wall;
        (d) a cam plate provided in the hollow portion and able to be freely disposed at a sleeve side or at a side opposite a sleeve side;
        (e) a roller provided within the hollow portion between the cam plate and the sleeve, and at a time when the drive member is rotated in the one direction, when the cam plate is disposed at the sleeve side, the roller is pressed by the cam plate and engages with the sleeve; and
        (f) a clutch device provided at an outer periphery of the peripheral wall of the drive member in correspondence with the cam plate, and at a time when the drive member is rotated in the one direction by the pretensioner mechanism, the clutch device disposes the cam plate at the sleeve side and makes the roller engage with the sleeve so as to rotate the sleeve integrally with the drive member, and at a time when the sleeve is rotated in the other direction by the force limiter mechanism via the take-up shaft, the clutch device disposes the cam plate at the side opposite the sleeve side so as to permit relative rotation of the sleeve with respect to the drive member.

2. A webbing retractor according to claim 1, wherein the clutch device includes:
    (a) an anchor valley formed in a configuration which is recessed toward an inner side of the drive member along a peripheral direction of an outer surface of the peripheral wall of the drive member, the anchor valley having an end portion at each of a rotating direction one direction side and a rotating direction other direction side;
    (b) a clutch ring formed in a substantially hollow cylindrical shape, and provided in a state of surrounding the peripheral wall of the drive member;
    (c) an anchor mountain formed in a configuration which protrudes toward the sleeve at an inner peripheral surface of the clutch ring in correspondence with the anchor valley, the anchor mountain being inserted into the anchor valley;
    (d) a recess portion formed in a configuration which is recessed toward the side opposite the sleeve side in the inner peripheral surface of the clutch ring in correspondence with the cam plate, and when the end portion of the anchor valley at the rotating direction one direction side engages with the anchor mountain, the cam plate is insertable into the recess portion;
    (e) a limiting device provided at the clutch ring and limiting rotation of the clutch ring in the other direction,
    wherein at a time when the drive member is rotated in the one direction by the pretensioner mechanism, in a state in which the drive member and the clutch ring are rotated integrally due to the end portion of the anchor valley at the rotating direction other direction side engaging the anchor mountain, the cam plate is anchored on the inner peripheral surface of the clutch ring and the cam plate is disposed at the sleeve side, and at a time when the sleeve is rotated in the other direction by the force limiter mechanism, in a state in which rotation of the clutch ring in the other direction is limited by the limiting device, the drive member is rotated by a predetermined angle in the other direction via the roller and the end portion of the anchor valley at the rotating direction one direction side engages with the anchor mountain, such that the cam plate is inserted into the recess portion and is disposed at the side opposite the sleeve side.

3. A webbing retractor according to claim 2, wherein the cam plate has, at a side wall of the cam plate on the sleeve side thereof, an inclined surface which approaches the sleeve along a direction toward the rotating direction other direction side; and
    at a time when the drive member is rotated in the one direction by the pretensioner mechanism, in a state in which the cam plate is disposed at the sleeve side by the clutch device, the inclined surface rotates toward the one direction with respect to the roller, and the roller is pressed by the inclined surface such that the roller engages with the sleeve.

4. A webbing retractor according to claim 3, wherein an end portion of the cam plate at the rotating direction one direction side is disposed and rotatably supported within the hollow portion.

5. A webbing retractor according to claim 4, wherein the limiting device:
    (a) is provided with a gear at an outer periphery of the clutch ring;
    (b) places a pawl, which corresponds to the gear, so as to oppose the gear and so as to be rotatably supported; and
    (c) is structured so as to include a pressing member which presses the pawl with respect to the gear such that the pawl meshes with the gear.

6. A webbing retractor according to claim 4, wherein the pretensioner mechanism further includes:

(a) a cylinder, one end of which is open; and (b) a piston having, at one end, an engagement portion whose peripheral configuration is equivalent to an inner peripheral configuration of the cylinder, and having, at another end, a rack.

7. A webbing retractor according to claim 6, wherein the piston is disposed within the cylinder such that the rack is disposed at an opening side of the cylinder, and the engagement portion is closely fit to an inner wall of the cylinder and is slidably held within the cylinder.

8. A webbing retractor according to claim 7, wherein the drive member has a pinion.

9. A webbing retractor according to claim 8, wherein, in a state in which the piston is disposed within the cylinder, the cylinder is disposed in a vicinity of the drive member, and the piston slides within the cylinder, and the rack of the piston meshes with the pinion of the drive member, such that the sleeve is rotated in the one direction and the webbing is taken-up.

10. A webbing retractor according to claim 2, wherein the limiting device is a clutch spring.

11. A webbing retractor according to claim 1, wherein the cam plate has, at a side wall of the cam plate on the sleeve side thereof, an inclined surface which approaches the sleeve along a direction toward the rotating direction other direction side; and at a time when the drive member is rotated in the one direction by the pretensioner mechanism, in a state in which the cam plate is disposed at the sleeve side by the clutch device, the inclined surface rotates toward the one direction with respect to the roller, and the roller is pressed by the inclined surface such that the roller engages with the sleeve.

12. A webbing retractor according to claim 11, wherein an end portion of the cam plate at the rotating direction one direction side is disposed and rotatably supported within the hollow portion.

13. A webbing retractor according to claim 12, wherein the pretensioner mechanism further includes:

(a) a cylinder, one end of which is open; and (b) a piston having, at one end, an engagement portion whose peripheral configuration is equivalent to an inner peripheral configuration of the cylinder, and having, at another end, a rack.

14. A webbing retractor according to claim 13, wherein the piston is disposed within the cylinder such that the rack is disposed at an opening side of the cylinder, and the engagement portion is closely fit to an inner wall of the cylinder and is slidably held within the cylinder.

15. A webbing retractor according to claim 14, wherein the drive member has a pinion.

16. A webbing retractor according to claim 15, wherein, in a state in which the piston is disposed within the cylinder, the cylinder is disposed in a vicinity of the drive member, and the piston slides within the cylinder, and the rack of the piston meshes with the pinion of the drive member, such that the sleeve is rotated in the one direction and the webbing is taken-up.

* * * * *